(12) United States Patent
McAndrews

(10) Patent No.: US 9,016,761 B1
(45) Date of Patent: Apr. 28, 2015

(54) AUTOMOBILE SNOW SHIELD

(71) Applicant: Glenn McAndrews, Lebanon, OH (US)

(72) Inventor: Glenn McAndrews, Lebanon, OH (US)

( * ) Notice: Subject to any disclaimer, the term of this patent is extended or adjusted under 35 U.S.C. 154(b) by 0 days.

(21) Appl. No.: 14/187,228

(22) Filed: Feb. 22, 2014

Related U.S. Application Data

(63) Continuation of application No. 14/165,583, filed on Jan. 28, 2014, now abandoned.

(51) Int. Cl.
*B60J 1/20* (2006.01)
*B60J 5/04* (2006.01)

(52) U.S. Cl.
CPC ...... *B60J 1/2094* (2013.01); *B60J 1/20* (2013.01); *B60J 5/0493* (2013.01)

(58) Field of Classification Search
CPC .......... B60J 1/2094; B60J 1/20; B60J 1/2002; B60J 5/0493; B60J 5/0494
USPC .......... 296/152, 154, 213; 160/47, 49, DIG. 2
See application file for complete search history.

(56) References Cited

U.S. PATENT DOCUMENTS

| | | | | |
|---|---|---|---|---|
| 1,593,187 A * | 7/1926 | Mathis | ............ | 296/152 |
| 1,722,864 A * | 7/1929 | Seidel, Jr. | ............ | 160/49 |
| 1,799,267 A * | 4/1931 | Walton | ............ | 296/152 |
| 2,034,342 A * | 3/1936 | Hay | ............ | 296/152 |
| 2,599,014 A * | 6/1952 | Pritchard | ............ | 296/152 |
| 2,657,089 A * | 10/1953 | Kaul | ............ | 296/152 |
| 4,527,466 A * | 7/1985 | Kossor et al. | ............ | 454/133 |
| 4,558,633 A * | 12/1985 | Lingg | ............ | 454/131 |
| 4,743,061 A * | 5/1988 | Pompa | ............ | 296/152 |
| 5,460,425 A * | 10/1995 | Stephens | ............ | 296/152 |
| 6,044,856 A * | 4/2000 | Cano | ............ | 135/88.07 |
| 6,341,811 B1 * | 1/2002 | Schoelkopf | ............ | 296/154 |
| 6,948,766 B1 * | 9/2005 | Capote et al. | ............ | 296/152 |
| 7,604,281 B1 * | 10/2009 | Raynor | ............ | 296/99.1 |
| 8,662,563 B1 * | 3/2014 | Hardenbrook | ............ | 296/154 |
| 2002/0089208 A1 * | 7/2002 | Mashborn | ............ | 296/97.1 |
| 2007/0241586 A1 * | 10/2007 | Clark | ............ | 296/152 |

* cited by examiner

*Primary Examiner* — Jason S Daniels

(57) ABSTRACT

A shield for use in the interior of an automobile, attached on the side window pane or door frame, to prevent the ingress of snow, ice and the like when the driver or passenger opens the door; containing attaching means and an inwardly extended lip therefrom; the lip being positioned in a manner to flexibly contact the overhead or side panel when the automobile door is opened or closed.

12 Claims, 4 Drawing Sheets

AUTOMOBILE SNOW SHIELD

CROSS-REFERENCE TO RELATED APPLICATIONS

This application is a continuation of U.S. patent application Ser. No. 14/165,583, filed Jan. 28, 2014. The patent application identified above is incorporated herein by reference in its entirety to provide continuity of disclosure.

BACKGROUND OF THE INVENTION

The present invention relates to automobile accessories and door features whose use in the interior compartment of the automobile provides convenient benefits to the automobile's occupants. More particularly, the present invention is a shield attached to the inboard top and side portion of the window pane or the top portion of the door frame of automobiles.

In conditions of snowy weather it is not uncommon for snow or ice that has accumulated on the tops of both overhead and doors, to enter the interior of an automobile when the door is opened. The modern aerodynamic styling of an automobile body often results in the seam between the door frame and overhead to be positioned vertically in line with the automobile's interior. Snow or ice accumulated in the vicinity of the seam will fall inside the automobile when the door is opened. This is especially inconvenient to the automobile's occupants should the snow or ice deposit on the seat.

It is therefore an object of the present invention to provide a shield that prevents the ingress of snow or ice into the interior of an automobile upon entry by passenger or driver.

In the related art, there are disclosed numerous weather guards affixed to the window panes or doors of automobiles. For example, U.S. Pat. No. 2,034,342 (Hay), U.S. Pat. No. 2,318,143 (Cutting), U.S. Pat. No. 2,599,014 (Pritchard), U.S. Pat. No. 2,657,089 (Kaul), U.S. Pat. No. 4,527,466 (Kossor), and U.S. Pat. No. 6,341,811B1 (Schoelkopf) describe devices applied to the exterior of the automobile. U.S. Pat. No. 8,079,629 B2 (Raynor) discloses a shield attached to both door frame and overhead. Finally, U.S. Pat. No. 1,593,187 (Mathis) shows a shield mounted interiorly, in the same vertical plane of the window pane. None of these devices extend laterally into the interior of the automobile, nor do they address the problem of snow deposits inside the automobile when the door is opened. As most automobile weather guards and awnings in the prior art are exteriorly installed devices, meant to combat the effects of weather, and weather further being generally associated with outside, external, or exterior happenings, the present invention as an automobile interior accessory is both novel and unobvious.

SUMMARY OF THE INVENTION

Briefly described, a shield is disclosed for use on the window pane or door frame of an automobile. The shield attaches to the inboard, outer peripheral portion of the automobile's door window pane or door frame.

The present invention is comprised, in combination, of an attachable and releasable mount feature, body portion, and a lip. The mount feature attaches to the side window pane or sill of the upper door frame. Made integrally or mechanically joined to the mount feature, a body portion primarily functions as a catch basin, being interposed between the mount feature and the lip; the latter functioning as a brush-like seal against stationary components of the automobile.

The present invention extends inwardly from the door for a distance sufficient to capture snow debris during entry by passenger or driver. Conveniently, a distance of approximately 2 to 7 inches, more than sufficient to catch the snow, is about the width of the door frame and adjoining overhead when the door is closed. As such, the shield does not adversely protrude into the compartment. Nor does it restrict viewing by the automobile's occupants thru the side window pane because the invention's installed position is generally aligned with the outer peripheral edge of the window pane.

The lip is comprised of soft bristles, and the like. Alternatively, the lip is made from a thin, flexible flap, and the like. In either case, the end of the lip is configured so as to come into contact with the compartment overhead by turning generally from the horizontal or lateral direction to the vertical direction, or as in some embodiments, additionally turning rearward in order to contact the automobile's stationary side panel.

Alternatively, the body portion is eliminated in some embodiments of the present invention, wherein a substantial lip serves the same functionality.

Conveniently, the thickness and composition of auto window pane glass is standardized and thus allows for a wide selection of mounting methods that can be applied independently of the make or model of the automobile. Such methods include, but are not limited to, adhesives, suction cups, U-shape channels, and clips. Similarly, the inboard sill of the upper door frame provides a surface of suitable dimensions, generally between 0.25 and 1.0 inches in width, for mounting the present invention. Additionally, the sill is made from ferrous material and thus lends itself for the attachment of magnets and the like.

Additionally, weather stripping in the door frame is common across automobile types and permits additional mounting methods such as insert tabs. Provided the mount feature of the shield is sufficiently thin, generally 0.5 to 3 mm, it can be inserted between the window pane and the weather-stripping or draped over the top edge of the window pane and captured by the weather-stripping and door frame when the window pane is raised up to its uppermost position. Tapering the insert tab's thickness by narrowing the material towards its insertion end, facilitates insertion between the window pane and weather-stripping.

Once adjoined with the window pane and door frame, the shield moves with the automobile's door when the door is opened or closed. The construction and positioning of the shield prevents snow or ice that has deposited on the automobile's topside from entering the automobile's interior by collecting the snow and ice that falls in the gap created between the automobile overhead and automobile door frame when a driver or passenger opens the automobile's door.

Another object of the present invention is to provide a shield of simple and economical construction. It is envisioned that the present invention can be made from the groups of pliable materials comprising of foam, rubber or plastic, each offering varying levels of material flexibility. Alternatively, more rigid materials could be used if the geometry, matching that of the automobile's window and door frame, is precisely known prior to manufacture.

A further object of the present invention is to provide a shield permitting quick and effortless installation or removal from the side window pane or door frame of an automobile.

Another object of the present invention is to provide a shield that can be used on any window pane regardless of shape or contour and in any automobile regardless of make and model.

BRIEF DESCRIPTION OF THE DRAWINGS

The advantages and features of the present invention will become better understood with reference to the more detailed description and drawings wherein like numerals are employed to designate like parts throughout the drawings and.

DETAILED DESCRIPTION OF THE INVENTION

Figure 1:
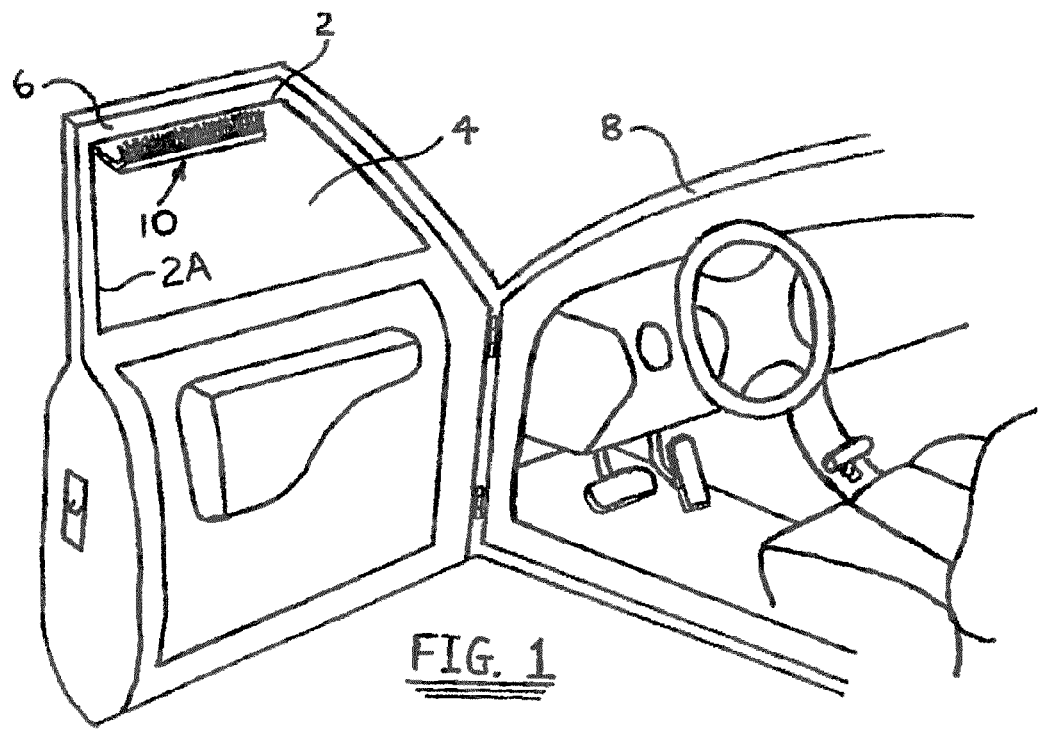
FIG. 1 is an exterior perspective view of an automobile with its door opened, depicting an installed shield on a window that is fully raised in the window pane opening.
Figure 2:
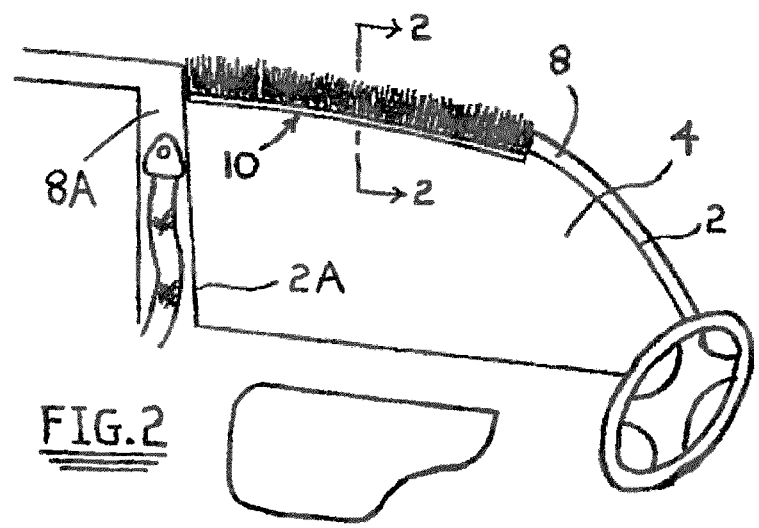
FIG. 2 is a driver's point of view of the shield of FIG. 1.

Referring now to the present invention in more detail, in FIG. 1 and FIG. 2 there is shown shield 10, attached to the top portion of window pane 4, with said window pane 4 in the raised position; the raised position being defined by top edge 2 and rear side edge 2A of window pane 4, penetrably received into door frame 6. Should shield 10 be attached to door frame 6, FIG. 1 and FIG. 2 remain applicable. Stationary side panel 8A helps support overhead 8.

As shown in FIG. 1, a gap of varying degree is created between door frame 6 and overhead 8, when door frame 6 moves from its fully opened position to its fully closed position.

Figure 3:
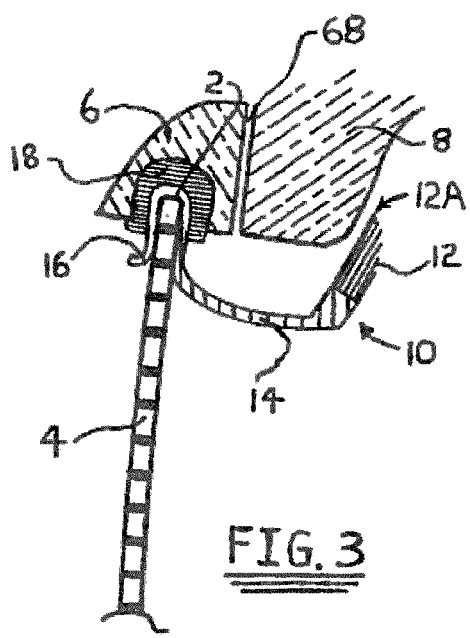
FIG. 3 is a fragmentary cross section of the shield of FIG. 2 taken along line 2-2 of FIG. 2.

In further detail, now referring to the present invention of FIG. 3, gap 68 is shown between door frame 6 and overhead 8 when the door is closed. Weather-stripping 18 is permanently embodied into door frame 6 for the purpose of sealing the automobile's interior from the weather elements of wind, rain, snow, and the like. Weather-stripping 18 is resilient, spongy, and crushable; designed to engage top edge 2 of window pane 4 in the raised position. This property permits accommodation of supplemental material, beyond that of window pane 4 itself, to be agreeably received into weather-stripping 18. Prior art, like that of U.S. Pat. No. 4,743,061, similarly takes advantage of deformable weather-stripping to receive hooks and the like. In the present invention, mount 16 of shield 10, is shown captured by window pane 4 and weather-stripping 18 when window pane 4 is in the raised position. Body portion 14 of shield 10 extends laterally inward ending in lip 12. Numeral 12A designates what hereafter will be termed "lip end".

Figure 4:
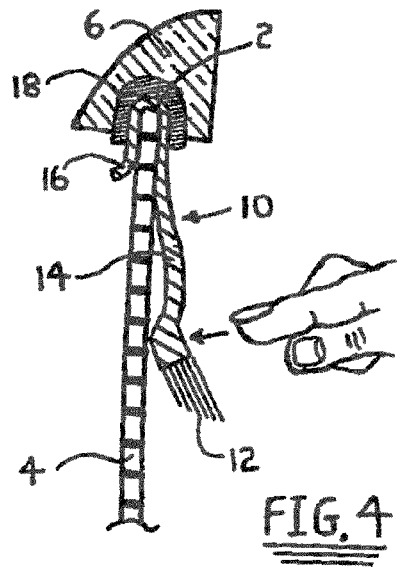
FIG. 4 is a fragmentary cross section of the shield of FIG. 3 depicting its inverted position.

In further detail, now referring to FIG. 4., shield 10 of FIG. 3 is shown on window pane 4 and door frame 6 when said door frame 6 is ajar or otherwise moved away from overhead 8 of FIG. 3. FIG. 4 is intended to elucidate the flexible nature of shield 10, having been depressed downward and against window pane 4 by a passenger or driver.

Figure 5:
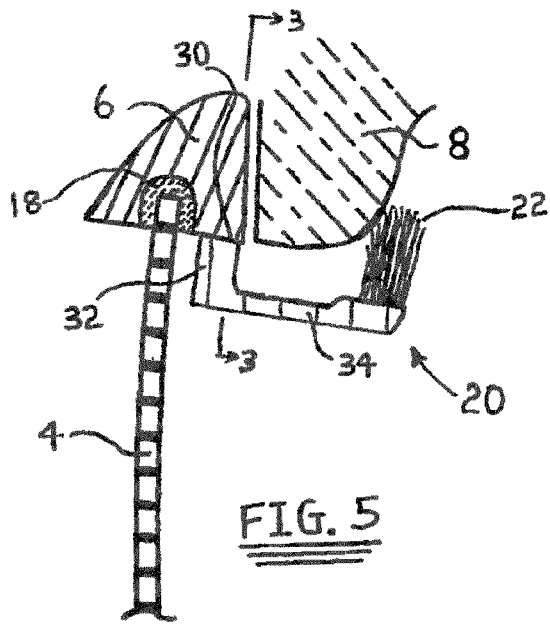
FIG. 5 is a fragmentary cross section of an alternate embodiment of the present invention.
Figure 6:
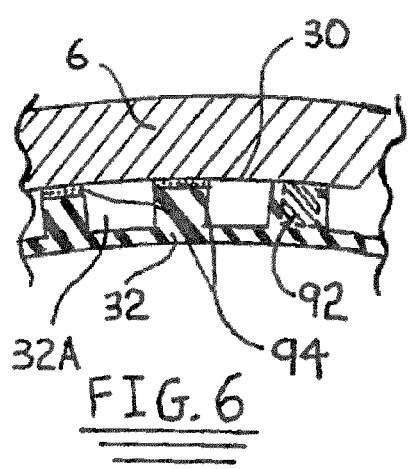
FIG. 6 is a fragmentary cross section of the shield of FIG. 5 taken along line 3-3 of FIG. 5.

In further detail, now referring to FIG. 5 and FIG. 6, shield 20 is comprised of body portion 34, mount 32, and lip 22. Mount 32 further contains magnetic plugs 92 and the like, or magnetic strips 94, dispersed along the fore & aft direction for the purpose of magnetically joining mount 32 to sill 30; eliminating the need then to engage the weather-stripping 18 of FIG. 5. Serrations 32A, essentially free space between mounts 32, provide additional flexibility in the longitudinal or fore and aft direction.

Figure 7:
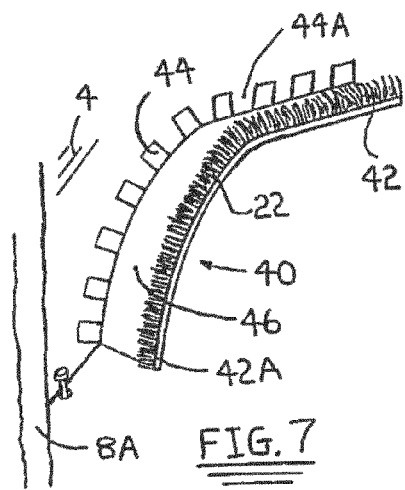
FIG. 7 is a fragmentary perspective view of an alternate embodiment of the present invention.
Figure 8:
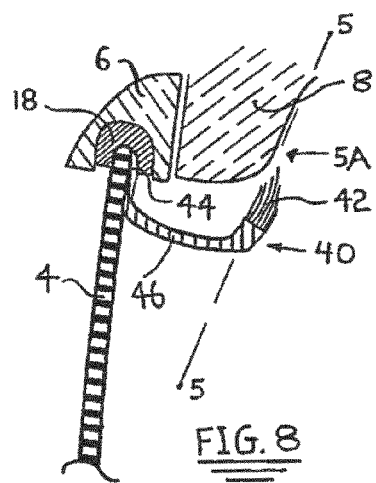
FIG. 8 is a fragmentary cross section of the shield of FIG. 7.
Figure 13:
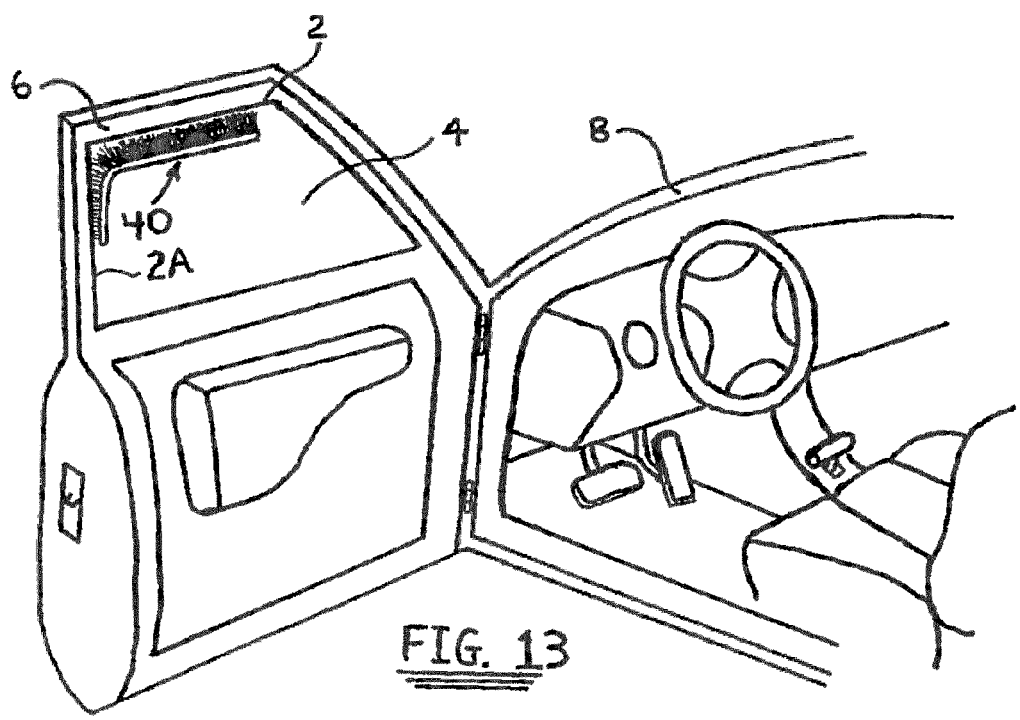
FIG. 13 is an exterior perspective view of an automobile with its door opened, depicting the shield of FIG. 7 installed on a window that is fully raised in the window pane opening.
Figure 14:
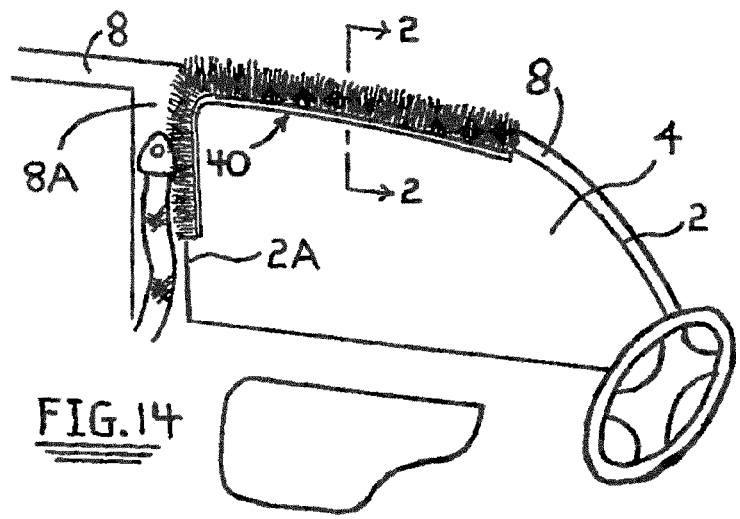
FIG. 14 is a driver's point-of-view of the shield of FIG. 13.

In further detail, FIG. 7 depicts an uninstalled shield 40 and FIG. 8, FIG. 13, and FIG. 14 depicts an installed shield 40. Shield 40 is comprised of body portion 46 terminating in a vertically aligned lip 42 and rearwardly aligned lip 42A. Lip 42 contacts overhead 8 and lip 42A contacts side panel 8A when the automobile door is opened. In this embodiment, mount 44, comprised of tabs or like protuberances, extend vertically and rearwardly from body portion 46, and are positively inserted between window pane 4 and weather-stripping 18 during installation. Serrations 44A, essentially free space between mounts 44, result in a freely bendable shield 40 in the longitudinal or fore and aft direction. Line 5-5 is shown to define what will be hereafter termed "overhead width", namely the lateral distance between the vertical plane made by window 4 and a tangent 5-5 at the point where overhead 8 abruptly turns upward (see arrow 5A). The upward turn is made to provide the necessary headroom for the automobile occupants. It is an object of the present invention to position lips 42 and 42A at a lateral or inboard distance sufficiently beyond overhead width, so that lips 42 and 42A make contact with overhead 8 and side panel 8A, respectively, only after the door has started to move to its open position.

Figure 9:
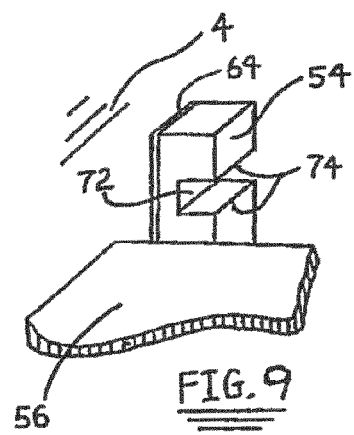
FIG. 9 is a perspective view of an alternate embodiment of the present invention.
Figure 10:
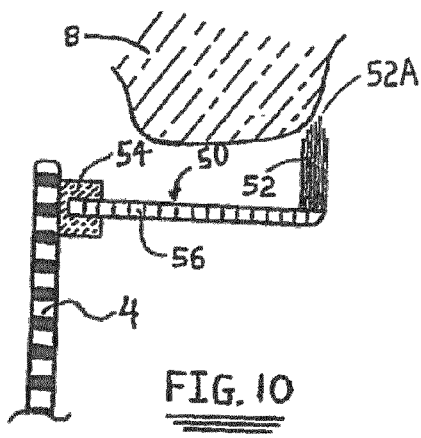
FIG. 10 is a fragmentary cross section of the shield of FIG. 9.

In further detail, FIG. 9 and FIG. 10 depict another embodiment of the present invention. The outboard end of body portion 56 of shield 50 is inserted past lips 74 of slot 72 contained in mounts 54 attached to window pane 4. On the opposite or inboard end of body portion 56, lip 52 extends vertically upward to a height sufficient to result in lip end 52A contacting overhead 8 when the door is opened. Mount 54 contains adhesive strip 64 used to attach mount 44 to window pane 4.

Figure 11:
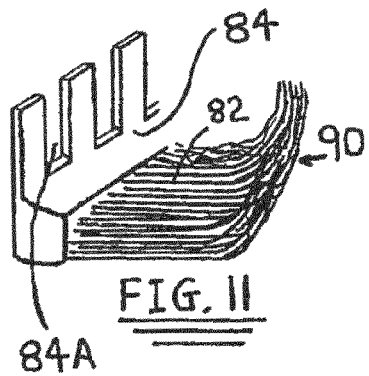
FIG. 11 is a fragmentary perspective view of an alternate embodiment of the present invention.

In further detail, FIG. 11 depicts an embodiment of the present invention, shield 90, comprised of mount 84, serrations 84A, and lip 82. In this embodiment, elements of lip 82, bristles and the like, are formed to transition from the inboard lateral direction to the vertical direction, allowing then lip 82 to be directly connected to mount 84. As the means to collect the deposited snow or ice, the functionality of the body portion shown in previous embodiments is performed by lip 82.

Figure 12:
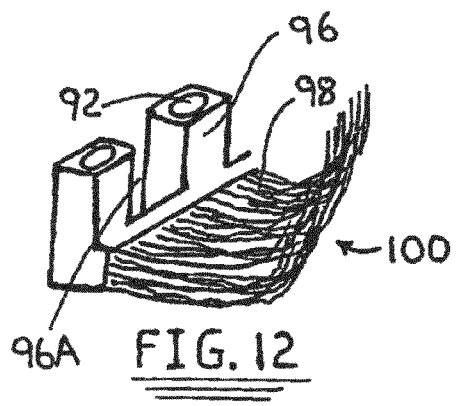
FIG. 12 is a fragmentary perspective view of an alternate embodiment of the present invention.

In further detail, FIG. 12 depicts an embodiment of the present invention, shield 100, comprised of mount 96, serrations 96A, and lip 98. In this embodiment, elements of lip 98, bristles and the like, are formed to transition from the inboard lateral direction to the vertical direction, allowing then lip 98 to be directly connected to mount 96. The functionality of the body portion shown in previous embodiments of the present invention is performed by lip 98. Magnetic plugs 92 like those of FIG. 6 are embedded in mount 96.

The construction details of the present invention as shown in FIG. 1 through FIG. 14 are that shields 10, 20, 40, 50, 90, 100, may be made of plastic, rubber, metal, and the like. In addition to these materials, lips 12, 22, 42, 52, 82, 98 can be made from man-made or naturally occurring fibers, filaments, bristles, and the like. Alternatively, lips 12, 22, 42, 52, 82, 98 can be made from thin, bendable, flap-like material such as rubber, soft plastic, and the like. Except for lips 12, 22, 42, 52, 82, 98, vertically aligned components are deliberately avoided throughout the present invention in order to achieve flexibility and thus adaptability to the fore and aft contour of window pane 4 or door frame 6.

Shield 10 of FIG. 4 is necessarily made of resilient material possessing elastic properties that result in a return to its originally installed shape after having been temporarily deformed. Molded rubber offers such properties.

In further detail, referring to shield 20 of FIG. 5 and FIG. 6, the mating of mount 32 to sill 30 of door frame 6 is accomplished by the magnetic force of magnets 92 or 94, resulting in a quick-release type connection. Magnets 92 are permanently inserted in appropriately sized recesses in mount 32 with epoxy and the like. Magnetic strips 94 can be bonded to mount 32 with mechanical fasteners or adhesive. If so desired, mount 32 can be permanently joined to sill 30, avoiding then the use of magnets 92 and 94, with the use of adhesives, glues, and the like, or mechanical fasteners such as screws, rivets, and the like.

In further detail, referring to FIG. 7 and FIG. 8, although shield 40 could be made of semi-rigid material, it is preferably made from pliable material allowing then a completely adaptable, universally applied shield 40.

In further detail, referring to FIG. 9, adhesive strip 64 is a commercially available product, its use described later in the specification.

In further detail, referring to shield 50 of FIG. 9 and FIG. 10, mount 54 is made of a resilient material, such as rubber, plastic and the like, allowing separation of lips 74 in order to securely engage body portion 56 whose thickness is made slightly larger than slot 72 width in its free state. What would otherwise be an interference fit between mount 54 and body portion 56 if non-resilient material were employed; the fit between mount 54 and body portion 56 now functions as a quick-release connection owing to the elastic properties of mount 54.

In further detail, referring to FIG. 1 through FIG. 14, lips 12, 22, 42, 52, 82, 98, are joined to the body portions 14, 34, 46, 56 or mounts 84, 96 using existing industry practices of anchoring or fusing.

Referring now to FIG. 2 and FIG. 3, the use of shield 10 will be described. The user is required to first lower window pane 4, creating a sufficient opening between window pane 4 and door frame 6 to enable installation of shield 10, by hooking mount 16 onto top edge 2 of window pane 4. After the entire length of mount 16 has inserted over top edge 2, window pane 4 is raised up to its closed position. Shield 10 is now ready for use. During opening or closing of door frame 6, lip 12 will flexibly contact overhead 8. Lip 12 functions to seal the gap between body portion 14 and overhead 8 in order to discourage the inrush of air when the door is first opened. The inrush of air occurs because the volume of the automobile's interior dramatically increases when the door is opened. It is the inrush of air that along with gravity encourages the snow to deposit into the interior of the automobile.

Once the automobile's door is fully opened, the driver or passenger wishing to vacate shield 10 of any collected snow, could use one of several methods such as blowing, brushing, or removing the shield from the window pane 4 and turning it upside down. Typically, the driver having retrieved the snow brush from inside the automobile, will use it to clean both the windshield and shield 10.

Referring now to FIG. 4, a further option for vacating shield 10 of collected snow is disclosed. Leaving shield 10 in its installed position, the user simply has to push on the lip end of body portion 14 in order for its contents to spill onto the pavement.

Referring now to FIG. 5 and FIG. 6, shield 20 is installed by positioning the magnetically equipped mount 32 in close proximity to sill 30 until magnetic forces join shield 20 onto door frame 6. Detaching shield 20 requires simply pulling, by hand, shield 20 away from sill 30.

Referring now to the present invention of FIG. 7 and FIG. 8, shield 40 can be installed on window pane 4 by inserting mount 44 between weather-stripping 18 and window pane 4 along the entire length of shield 40. Removal of shield 40 is accomplished by sliding mount 44 away from weather-stripping 18 until it is no longer captured by window pane 4 and weather-stripping 18.

Referring now to the present invention of FIG. 9 and FIG. 10, shield 50 can be installed on window pane 4 in the vicinity of overhead 58 such that when body portion 56 is essentially horizontal and extended laterally into the compartment, lip 52 contacts overhead 58. Mount 54 of shield 50 is affixed to window pane 4 with adhesive strip 64. Commercially supplied adhesive strip 64 typically requires the user to remove backing layers, exposing a tacky surface on both sides of adhesive strip 64. Thus positioned between mount 54 and window pane 4, adhesive strip 64 keeps shield 50 affixed to window pane 4. With mount 54 in place on window pane 4, small adjustments to the contact between lip 52 and overhead 58 can be made by trimming lip 52 with a scissors.

Referring now to the embodiment of FIG. 11, shield 90 is installed in the same manner as the embodiment shown in FIG. 7. The construct of shield 90 is advantageous with respect to installation, being particularly well suited for adaptability to the curvature of modern automobile side window panes and door frames due to the inherent flexibility of the substantial lip 82 and serrations 84A.

Referring now to the embodiment of FIG. 12, shield 100 is installed in the same manner as the embodiment shown in FIG. 5. The construct of shield 100 is advantageous with respect to installation, being particularly well suited for adaptability to the curvature of modern automobile door frames due to the inherent flexibility of the substantial lip 98 and mount serrations 96A.

The advantages of the present invention include, without limitation, that it is portable and therefore can be stored easily during times of no snow, for example in the summer months. Further, the shield is easy to install and operate. Further, the construction is simple, uses readily available and inexpensive materials, and is therefore predictably low cost to the consumer. Although the shield can be precisely manufactured by the automobile OEM, designed in accordance with exact geometry of the door frame and window pane, the shield as shown herein, can be manufactured in a manner to universally fit a wide range of make and models including legacy models whose door and window geometry may be unknown.

In broad embodiment, the present invention is a shield mounted to the interior of an automobile window pane or door frame containing a mount feature and an inwardly extended lip; the lip being positioned in a manner to flexibly contact the overhead or side panel when the automobile door is opened or closed.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

Having thus described my invention I claim:

1. A shield device for preventing snow and ice, from entering an interior of an automobile when a door is opened, said automobile containing an overhead, a side panel, and at least one door with a window pane opening therein; said door further containing a door frame, a moveable window pane, and weather-stripping, said shield device comprising:

an attaching means, for interiorly securing said shield device to said window pane or said door frame;

a planar body portion extending laterally inward from said attaching means, having a longitudinal length substantially and proportionally corresponding to top and rear side edge dimensions of said window pane, further having a lateral width substantially and proportionally corresponding to lateral width dimensions of said side panel and said overhead;

a lip attached to a lateral side of said planar body portion opposite said attaching means, further containing a lip end extended and directionally aligned to flexibly contact said overhead or said side panel in circumstances when the door is being either opened or closed.

2. The shield device of claim 1, wherein said lip is comprised of bristles.

3. The shield device of claim 1, wherein said lip is comprised of a flap.

4. The shield device of claim 1, wherein said attaching means is comprised of tabs.

5. The shield device of claim 1, wherein said attaching means is comprised of magnets.

6. The shield device of claim 4, wherein a thickness of said tab is tapered towards an insertion end.

7. A shield device for preventing snow and ice, from entering an interior of an automobile when a door is opened, said automobile containing an overhead, a side panel, and at least one door with a window pane opening therein; said door further containing a door frame, a moveable window pane, and weather-stripping, said shield device comprising:

an attaching means, for interiorly securing said shield device to said window pane or said door frame;

a lip, extending laterally inward from said attaching means, having a longitudinal length substantially and proportionally corresponding to top and rear side edge dimensions of said window pane, further having a lateral width substantially and proportionally corresponding to lateral width dimensions of said side panel and said overhead;

a lip end, extending from a lateral side of the lip opposite said attaching means; directionally aligned to flexibly contact said overhead or said side panel in circumstances when the door is being either opened or closed.

8. The shield device of claim 7, wherein said lip is comprised of bristles.

9. The shield device of claim 7, wherein said lip is comprised of a flap.

10. The shield device of claim 7, wherein said attaching means is comprised of tabs.

11. The shield device of claim 7, wherein said attaching means is comprised of magnets.

12. The shield device of claim 10, wherein a thickness of said tab is tapered towards an insertion end.

* * * * *